Patented June 9, 1953

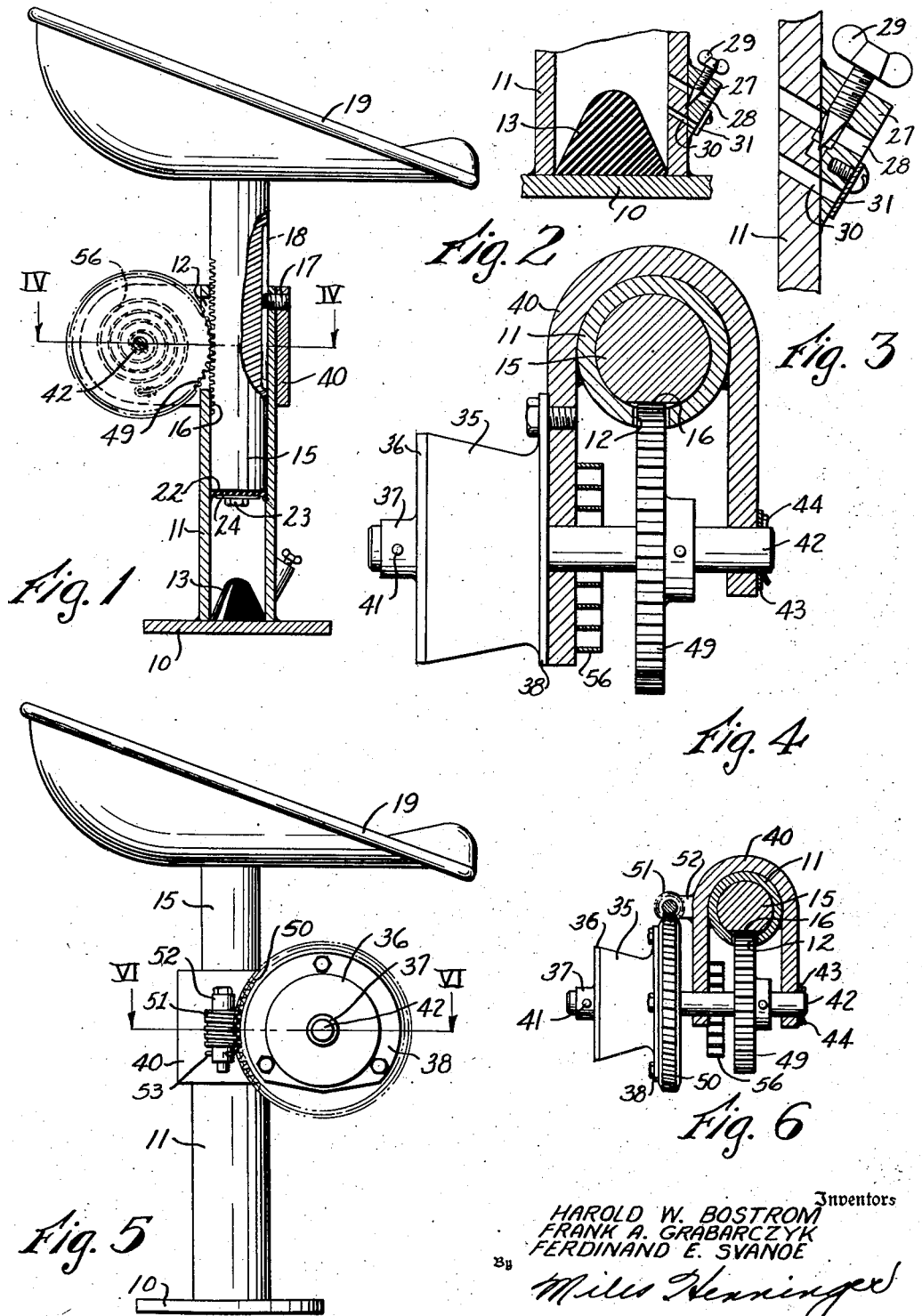

2,641,309

UNITED STATES PATENT OFFICE 2,641,309

TORSION SPRING SUPPORTED PEDESTAL SEAT MOUNTING

Harold W. Bostrom, Frank A. Grabarczyk, and Ferdinand E. Svanoe, Milwaukee, Wis., assignors to Bostrom Manufacturing Company, Milwaukee, Wis., a corporation of Wisconsin Application September 15, 1949, Serial No. 115,856

9 Claims. (Cl. 155—52)

This invention relates to improvements in vehicle seat mountings and particularly to the mounting for seats on vehicles which are without springing and which are to be employed over rough surfaces.

One object of the invention is to provide a mounting for vehicle seats in which the seat moves upwardly and downwardly with the occupant and is not drawn away from the occupant when the pressure imposed on the seat changes from a positive to a negative value.

Another object of the invention is to provide a resilient mounting for vehicle seats in which movement of a seat portion relative to a base portion takes place at different and variable rates for different directions of movement.

Another object of the invention is to provide a resilient mounting for the seats of vehicles, in which the resilience of the mounting can be kept within a predetermined frequency range regardless of the seat load.

A further object of the invention is to provide a resilient mounting for vehicle seats comprising a base portion and a seat portion and in which the load on the seat is so distributed as to provide low unit pressure on adjacent surfaces of the two seat portions.

Another object of the invention is to provide a resilient mounting particularly for the driver's seat of unsprung vehicles and which provides a maximum of comfort and safety for the driver without such seat movement as to reduce the driver's control of the various levers and wheels used in operation of the vehicle.

And another object of the invention is to provide a resilient mounting for the seats of vehicles such as tractors, and which seat will be simple, compact and relatively low in cost and which is sturdy and free from the need of maintenance substantially during the entire life of the tractor.

Objects and advantages other than those above set forth will be apparent from the following description when read in connection with the accompanying drawing in which:

Fig. 1 is a view partially in elevation and partially in section of a saddle seat mounting embodying the present invention.

Fig. 2 is a fragmentary sectional view on an enlarged scale of a portion of the structure shown in Fig. 1, the present section being taken on substantially a vertical axial plane.

Fig. 3 is an enlarged fragment of Fig. 2.

Fig. 4 is an enlarged transverse section on the plane of line IV—IV of Fig. 1.

Fig. 5 is an elevational view of the present saddle seat mounting with a portion thereof reversed as compared to Fig. 1 and showing means by which the resilience of the mounting may be adjusted.

Fig. 6 is a transverse sectional view on the plane of line VI—VI of Fig. 5.

Generally, the present seat mounting provides a base portion which coacts with a seat portion in producing a dashpot. The dashpot has one adjustable vent for the flow of air into and out of the dashpot and a second and separate vent permitting flow of air only out of the dashpot. Seat movement is thus damped differently in the two directions of movement of the seat portion relative to the base portion to reduce the amount of rebound of the seat.

A torsion spring joins the base and seat portions and adjusting means are provided for preloading or varying the response of the spring to the loading of the seat. A second torsion spring acts between the base portion and the first torsion spring and in different manner dependent on the direction of the seat portion movement relative to the base portion. A return rate is thus provided for upward movement of the seat which is different from the return rate when the seat moves downwardly. The second torsion spring thus further reduces the rebound of the seat.

Referring particularly to the drawings, 10 designates a base plate on which is fixed a tube 11 slotted as indicated at 12 for a portion of its length and from the upper end of the tube, the lower end of the tube being closed air-tight by the plate 10. The closed lower end of the tube receives a block 13 of resilient material to serve as a bumper for the movable portions of the seat. The base portion tube 11 telescopically receives a post 15 of the seat portion in relatively close slidable relation so that pressures at an angle to the axis of the post are distributed over large areas of the base tube interior surface and of the post exterior surface, and will not cause sticking of the post in the tube. If desired, suitable bearings may be provided between the tube and post to further minimize the friction therebetween.

If the post 15 is solid, rack teeth 16 are formed therein at the portion of the post movable opposite the tube slot 12, the post being kept from turning by a screw 17 extending through the tube 11 and into a groove 18 in the post. The screw and groove also perform the function of limiting both the downward and upward movement of the post in the tube. However, it has been found that the present structure inherently operates within given limits dependent on spring adjustment so that no special limit stops are required. If the post 15 is tubular for the sake of lightness, a rack is fixed thereon in place of the teeth 16 mentioned above. Such rack then extends through the slot 12 and serves as a guide thus eliminating the need for the screw 17 and the groove 18. The upper end of the post 15 has fixed thereon a seat 19 which is shown as being of the well known saddle type.

A flexible and preferably resilient cup member 22 is removably mounted on the lower end of the post 15 as by a screw 23 and a washer 24, to bear at its peripheral edge on the interior surface of the tube 11 and to coact therewith in forming a dashpot. A valve block 27 is fixed on the side of the tube 11 adjacent the lower end thereof. A passage 28 is formed through the block and the tube for the flow of air into and out of the dashpot as the piston thereof moves up and down respectively. The rate of such air flow through the passage 28 is controlled by a suitable valve 29 shown as being of the needle type. Another and separate passage 30 is formed in the valve block 27 and through the tube 11 and a one-way valve 31 which is shown as a flap valve, is mounted in the block over one end of the passage 30. Hence, the passage 30 is available only for escape of air from the tube and is closed by the flap valve 31 when air attempts to enter the tube through the passage 30.

The dashpot action is thus different in the two directions of movement of the post 15, downward movement of the post being at a rate determined by adjustment of the needle valve 29, and the free cross-sectional area of the passage 30 which depends on whether the flap 31 opens sufficiently to make such passage fully effective. The rate of upward movement of the post is less than that of its downward movement and is determined only by the free cross-sectional area of the passage 28 because closure of flap 31 prevents flow of air into the tube. The dashpot is therefore highly effective in controlling seat rebound which would otherwise be very disturbing to the user of the seat.

The rate of post and seat movement either downward or upward is also controlled by a torsion spring mounted at one end on the tube 11 and connected at the other end with the post 15. The torsion spring is herein shown as comprising a substantially conical block 35 of resilient material such as rubber having a metal plate 36 with a hub 37 bonded to one end of the spring and a metal plate 38 bonded to the other end of the spring. The conical form of spring 35—38 has a variable spring rate or constant, the degree of variance depending on the shape of the resilient material as is well known.

A substantially U-shaped member 40 is fixed about the tube 11 so that the midline at the open end of the member is in the plane centrally and longitudinally through the rack or rack teeth on the post. Spring plate 38 is fixed to the outside of one of the legs of member 40 thus fixing one end of the spring to the tube 11 and supporting the spring. The hub 37 of the spring plate 36 has fixed thereto as by a pin 41, a shaft 42 which extends through the plate hub, the spring 35 and plate 38 and extends through the legs of the U-shaped support member 40 where the shaft may be rotatably supported in suitable bearings, if desired. The shaft 42 is held against endwise movement by any suitable means such as a washer 43 and a cotter pin 44 as shown.

A gear 49 is fixed to shaft 42 to mesh with rack 16 of post 15 at all times, thus movably connecting one end of the torsion spring 35—38 with the post. As the seat 19 is loaded, the post 15 and rack 16 move downwardly and the rack acts on the gear 49 to rotate shaft 42 and to apply torque to the spring. When the load is removed from the seat, the force stored in the spring by the torsion thereof is released and the spring returns the seat to a predetermined initial position.

The rate of movement of the seat relative to the base may be varied by imposing an initial torque on the spring by adjusting means shown in Figs. 5 and 6. When such adjusting means are employed, the plate 38 has fixed thereto a worm wheel 50 engaging with a worm 51 rotatable in a mounting 52 on the support 40. The worm and worm wheel are locked in predetermined position by a pin 53 passing through holes in the worm mounting 52 and the worm 51 to prevent release of the force imposed on the spring. Although locking of the worm at each complete turn thereof is believed to be sufficient, a plurality of holes may be provided so that the worm may be locked after rotation for only a fraction of a turn. An initial or preloading torque is hence imposed on the spring to produce different spring action from the spring action occurring when the spring is not pre-loaded. The spring action is thus adjustable to compensate for the varying weights of users of the seat.

It will be understood that the torsion spring 35—38 tends to produce instantaneous release of the energy stored therein. Hence, it is desirable to provide means for limiting the rate of release of such energy or the so-called return rate of the spring 35—38. Such means are herein shown as another torsion spring acting between the support 40 and the shaft 42. Such second torsion spring is shown as a metallic spiral 56 fixed at its outer end on the interior surface of one leg of the support 40 and fixed at its inner end on the shaft 42 (see Fig. 1). The ends of the second spring are thus so connected that the spring 56 is unwound as the post moves downward and rewound as the post moves upwardly. Upon rewinding of spring 56, the friction between the turns acts toward the end of the rewinding action and increases as the degree of rewinding increases. The spiral spring is unwound until the seat post reaches its lowest point which is dependent on the weight of the driver and the preloading of the spring, and begins to rewind as the post moves upwardly. As the seat post moves above its position when the seat is empty, the turns of the spiral spring approach one another, the turns of the spring come into contact with one another and the turns of the spring are pressed on one another increasingly as the seat post approaches its uppermost position. Winding of the spiral spring absorbs some energy from the rubber spring and friction between the turns of the spiral spring takes up increasing amounts of energy from the rubber spring as the turns of the spiral spring are pressed on one another. The rate of release of energy of the rubber spring 35—38 is thus increasingly damped as the seat post moves upwardly. The spring 56 therefore reduces the return rate of spring 35—38 and further reduces the rebound of the seat 19.

It will thus be seen that the present invention provides a relatively inexpensive and simple resilient mounting for the seat of an unsprung vehicle of which the rider would otherwise be subjected to violent shocks and jars resulting from movement of the vehicle over rough surfaces. A first torsion spring movably joins a base portion and a seat portion of the seat mounting and is initiallly adjustable or "pre-loadable" to vary the force against which the seat acts in its downward movement. A second torsion spring varies the action of the first spring upon upward movement of the seat and thus varies the return rate of the first torsion spring and reduces the rebound of the seat. The base and seat portions coact to produce a dashpot of which one vent is adjustable to vary the dashpot action as desired dependent on the loading of the seat. The dashpot is provided with separate passages for the flow of fluid into and out of the dashpot and for the flow of fluid only out of the dashpot thus further reducing the rebound of the seat.

Although but one embodiment of the present invention has been illustrated and described, it will be apparent to those skilled in the art that various changes and modifications may be made therein without departing from the spirit of the invention or from the scope of the appended claims.

We claim:

1. In a mounting for a seat for vehicles, a tubular base portion mounted on the vehicle, a seat portion post slidable in the tubular base portion and coacting therewith in forming a dashpot, means mounted on the base portion for controlling the flow of air into and out of the dashpot and at different rates of flow dependent on the direction of movement of the seat portion, and torsion spring means connecting the base and seat portions for restraining movement of the seat portions relative to the base portion.

2. In a mounting for a seat for vehicles, a base portion tube mounted on the vehicle and forming a dashpot cylinder, a seat portion post reciprocally movable in the base portion tube and providing a dashpot piston, adjustable means mounted on the base portion for controlling the flow of air into and out of the dashpot, non-adjustable means mounted on the base portion for flow of air out of the dashpot only, and torsion spring means connecting the base and the seat portions for resiliently restraining movement of the seat portion relative to the base portion.

3. In a mounting for a seat for vehicles, a base portion tube mounted on the vehicle and forming a dashpot cylinder, a seat portion post reciprocable in the base tube and forming a dashpot piston, the base portion tube having passages through the wall thereof for connecting the interior of the tube with atmosphere, a valve controlling flow of air through one passage and both into and out of the base tube dependent on the direction of movement of the seat post therein, a valve permitting flow of air out of the tube only upon movement of the seat post in one direction, and torsion spring means connecting the base portion and seat portion for restraining movement of the seat portion relative to the base portion.

4. In a mounting for a seat for vehicles, a base portion tube mounted on the vehicle and forming a dashpot cylinder, a seat portion post reciprocable in the base tube and forming a dashpot piston, the base tube having passages through the wall thereof for connecting the interior of the tube with atmosphere, a needle valve controlling flow of air through one passage and both into and out of the base tube dependent on the direction of movement of the seat post therein, a flap valve permitting flow of air out of the tube only upon movement of the seat post in one direction, and a plurality of torsion springs connected with the base tube and with the seat post, the springs coacting for restraining movement of the seat post in the base tube.

5. In a mounting for a seat for vehicles, a base portion tube mounted on the vehicle and forming a dashpot cylinder, a seat portion post reciprocable in the base tube and forming a dashpot piston, the base tube having passages through the wall thereof for connecting the interior of the tube with atmosphere, a valve controlling flow of air through one passage and both into and out of the base tube dependent on the direction of movement of the seat post therein, a valve controlling flow of air through another passage and out of the tube only upon movement of the seat post in one direction, a rubber torsion spring mounted on the base tube, a spiral torsion spring mounted on the base tube and adapted to wind and to unwind for bringing the turns thereof toward and away from contact with one another responsive respectively to release of tension of the rubber spring and applying of the tension to the rubber spring, and means for connecting the two springs between the base tube and the seat post for restraining movement of the seat post relative to the base tube.

6. In a mounting for a seat for vehicles, a base portion tube mounted on the vehicle and forming a dashpot cylinder, the base tube having a slot in a portion of the base tube wall and longitudinally thereof, a seat portion post reciprocable in the base tube and forming a dashpot piston, a post portion having a toothed rack formed in a portion of the surface thereof movable longitudinally of and opposite the slot in the base tube, valve means on the base tube for controlling flow of air into and out of the base tube at different rates dependent on the direction of movement of the seat post relative to the base tube, torsion spring means for restraining movement of the seat post in the base tube, and a gear engaged with the post rack and connected with the spring means for transmitting movement of the seat post to the spring means and for transmitting the spring reaction from the base tube to the seat post.

7. In a mounting for a seat for vehicles, a base portion tube mounted on the vehicle and forming a dashpot cylinder, a seat portion post reciprocable in the base tube and forming a dashpot piston, the base portion tube having passages through the wall thereof for connecting the interior of the tube with atmosphere, a valve controlling flow of air through one passage and both into and out of the base tube dependent on the direction of movement of the seat post therein, a valve permitting flow of air out of the tube only upon movement of the seat post in one direction, torsion spring means connecting the base portion and seat portion for restraining movement of the seat portion relative to the base portion, and means for initially imposing a torque on the spring means.

8. In a mounting for a seat for vehicles, a base portion tube mounted on the vehicle and forming a dashpot cylinder, a seat portion post reciprocable in the base tube and forming a dashpot piston, the base tube having passages through the wall thereof for connecting the interior of the tube with atmosphere, a valve controlling flow of air through one passage and both into and out of the base tube dependent on the direction of movement of the seat post therein, a valve controlling flow of air through another passage and out of the tube only upon movement of the seat post in one direction, a rubber torsion spring mounted on the base tube, a spiral torsion spring mounted on the base tube and adapted to wind and to unwind for bringing the turns thereof toward and away from contact with one another responsive respectively to release of tension of the rubber spring and applying of the tension to the rubber springs, means for connecting the two springs between the base tube and the seat post for restraining movement of the seat post relative to the base tube, and means for initially imposing a torque on the two springs.

9. In a mounting for a seat for vehicles, a base portion tube mounted on the vehicle and forming the dashpot cylinder, a seat portion post reciprocable only in the base tube and forming a dashpot piston, the base portion tube having passages through the wall thereof for connecting the interior of the tube with atmosphere, a needle valve controlling flow of air through one passage and both into and out of the base tube dependent on the direction of movement of the seat post therein, a flap valve controlling flow of air through another passage and out of the tube only, a rubber torsion spring connected with the base tube, a spiral torsion spring connected with the base tube and adapted to wind and unwind some of the turns thereof into contact with one another dependent upon the direction and degree of movement of the seat post in the base tube, means for connecting both the springs between the base tube and the seat post, and means for initially imposing a torque on the springs and including a worm rotatably mounted on the base tube and a worm wheel connected with the springs.

HAROLD W. BOSTROM.
FRANK A. GRABARCZYK.
FERDINAND E. SVANOE.

References Cited in the file of this patent

UNITED STATES PATENTS

| Number | Name | Date |
|---|---|---|
| 1,278,730 | Oliver | Sept. 10, 1918 |
| 2,049,550 | Van Dresser | Aug. 4, 1936 |
| 2,460,596 | Roche | Feb. 1, 1949 |
| 2,484,722 | Nickelsen et al. | Oct. 11, 1949 |

FOREIGN PATENTS

| Number | Country | Date |
|---|---|---|
| 772,751 | France | Aug. 20, 1935 |
| 25,944 | Great Britain | Nov. 8, 1910 |